United States Patent
Moake

(10) Patent No.: US 9,158,031 B2
(45) Date of Patent: *Oct. 13, 2015

(54) INTERCHANGEABLE MEASUREMENT HOUSINGS

(71) Applicant: Halliburton Energy Services, Inc., Houston, TX (US)

(72) Inventor: Gordon L. Moake, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 379 days.

This patent is subject to a terminal disclaimer.

(21) Appl. No.: 13/674,661

(22) Filed: Nov. 12, 2012

(65) Prior Publication Data

US 2013/0061668 A1 Mar. 14, 2013

Related U.S. Application Data

(63) Continuation-in-part of application No. 12/445,552, filed as application No. PCT/US2007/008959 on Apr. 10, 2007, now Pat. No. 8,307,703.

(51) Int. Cl.
*G01V 5/04* (2006.01)
*E21B 47/01* (2012.01)

(52) U.S. Cl.
CPC .. *G01V 5/04* (2013.01); *E21B 47/01* (2013.01)

(58) Field of Classification Search
CPC .................................. E21B 47/01; G01V 5/04
See application file for complete search history.

(56) References Cited

U.S. PATENT DOCUMENTS

| | | | |
|---|---|---|---|
| 4,492,865 A | | 1/1985 | Murphy et al. |
| 4,553,428 A * | | 11/1985 | Upchurch .................. 73/152.51 |
| 4,570,481 A | | 2/1986 | McLaurin |
| 4,631,711 A | | 12/1986 | Fowler |
| 4,715,002 A | | 12/1987 | Vernon et al. |
| 4,958,517 A | | 9/1990 | Maron |
| 5,070,732 A * | | 12/1991 | Duncan et al. .................. 73/431 |
| 5,251,708 A | | 10/1993 | Perry et al. |
| 5,451,779 A | | 9/1995 | Spross et al. |
| 5,469,736 A | | 11/1995 | Moake |
| 5,720,293 A * | | 2/1998 | Quinn et al. .................. 600/505 |

(Continued)

FOREIGN PATENT DOCUMENTS

| | | |
|---|---|---|
| GB | 2320567 | 6/1998 |
| KR | 100794927 B1 | 1/2008 |
| WO | WO-2008/123654 A1 | 10/2008 |
| WO | WO-2008/123854AI | 10/2008 |
| WO | WO-2014/074263 A1 | 5/2014 |

OTHER PUBLICATIONS

"international Application Serial No. PCT/US2013/064362, International Search Report mailed Jan. 20, 2014", 3 pgs.

(Continued)

*Primary Examiner* — John Fitzgerald
(74) *Attorney, Agent, or Firm* — Schwegman Lundberg & Woessner, P.A.; Alan Bryson

(57) ABSTRACT

Apparatus and methods for operating the apparatus provide a modular unit of hardware to make measurements in a well. The modular unit may include a housing arranged for placement in a drill-string element, where the housing includes a sensor and is structured such that the housing is transferable to another drill-string element without a calibration during or after the transfer. The drill-string elements associated with the transfer may be of different sizes.

23 Claims, 10 Drawing Sheets

(56) References Cited

U.S. PATENT DOCUMENTS

| | | | |
|---|---|---|---|
| 5,821,405 A * | 10/1998 | Dickey et al. | 73/53.01 |
| 6,602,469 B1 * | 8/2003 | Maus et al. | 422/68.1 |
| 6,666,285 B2 | 12/2003 | Jones et al. | |
| 6,798,347 B2 * | 9/2004 | Henry et al. | 340/680 |
| 6,892,144 B2 * | 5/2005 | Slater et al. | 702/61 |
| 6,942,043 B2 | 9/2005 | Kurkoski | |
| 7,230,542 B2 * | 6/2007 | Smits et al. | 340/853.9 |
| 7,594,449 B2 * | 9/2009 | Tottewitz et al. | 73/866.5 |
| 7,933,731 B2 * | 4/2011 | Hollander et al. | 702/104 |
| 8,065,917 B1 * | 11/2011 | Brown et al. | 73/706 |
| 8,307,703 B2 | 11/2012 | Moake | |
| 8,397,561 B2 * | 3/2013 | Yamate et al. | 73/152.18 |
| 2003/0048198 A1 * | 3/2003 | Schultz et al. | 340/853.3 |
| 2003/0155121 A1 | 8/2003 | Jones et al. | |
| 2006/0220649 A1 * | 10/2006 | Martinez et al. | 324/347 |
| 2009/0217755 A1 * | 9/2009 | Hollander et al. | 73/432.1 |
| 2009/0255730 A1 | 10/2009 | Brune et al. | |
| 2010/0132434 A1 | 6/2010 | Moake | |
| 2011/0264394 A1 * | 10/2011 | Hollander et al. | 702/104 |

OTHER PUBLICATIONS

"International Application Serial No. PCT/US2013/064362, Written Opinion mailed Jan. 20, 2014", 9 pgs.

"U.S. Appl. No. 12/445,552, Final Office Action mailed Jul. 25, 2011", 6 pgs.

"U.S. Appl. No. 12/445,552, Non Final Office Action mailed Apr. 8, 2011", 8 pgs.

"U.S. Appl. No. 12/445,552, Notice of Allowance mailed Jul. 12, 2012", 5 pgs.

"Application U.S. Appl. No. 12/445,552, Preliminary Amendment filed Apr. 14, 2009", 3 pgs.

"U.S. Appl. No. 12/445,552, Response filed Mar. 28, 2011 to Restriction Requirement mailed Feb. 24, 2011", 7 pgs.

"U.S. Appl. No. 12/445,552, Response filed Jul. 8, 2011 to Non-Final Office Action mailed Apr. 8, 2011", 13 pgs.

"U.S. Appl. No. 12/445,552, Response filed Oct. 25, 2011 to Final Office Action mailed Jul. 25, 2011", 14 pgs.

"U.S. Appl. No. 12/445,552, Restriction Requirement mailed Feb. 24, 2011", 5 pgs.

"Indonesian Application Serial No. W00200902812, Office Action mailed Mar. 26, 2012", (w/ English Translation), 2 pgs.

"Indonesian Application Serial No. WO00200902812, Response filed Jun. 14, 2012 to Office Action mailed Mar. 26, 2012", (w/ English Translation), 2 pgs.

"International Application Serial No. PCT/US2007/008959, International Preliminary Report on Patentability mailed Oct. 22, 2009", 8 pgs.

"International Application Serial No. PCT/US2007/008959, International Search Report mailed Nov. 22, 2007", 3 pgs.

"International Application Serial No. PCT/US2007/008959, Written Opinion mailed Nov. 22, 2007", 7 pgs.

* cited by examiner

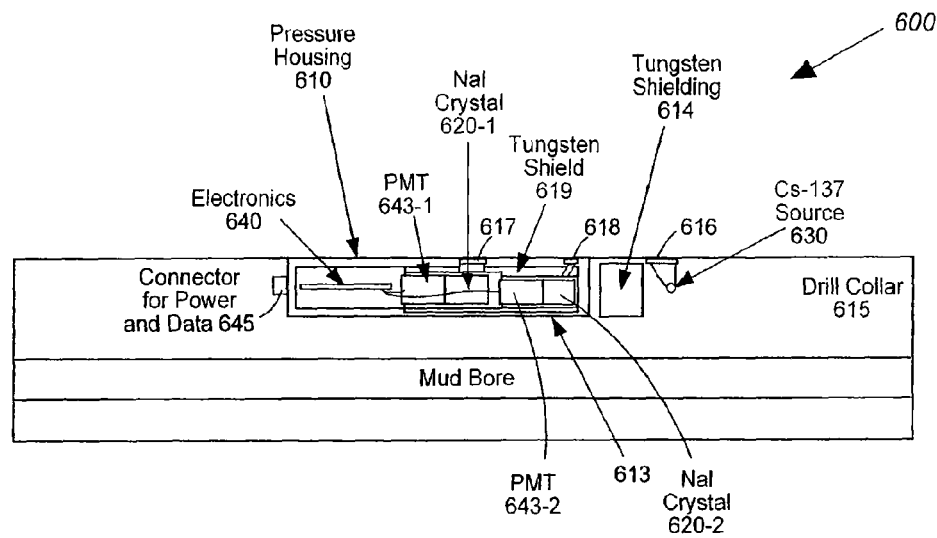
Fig.6
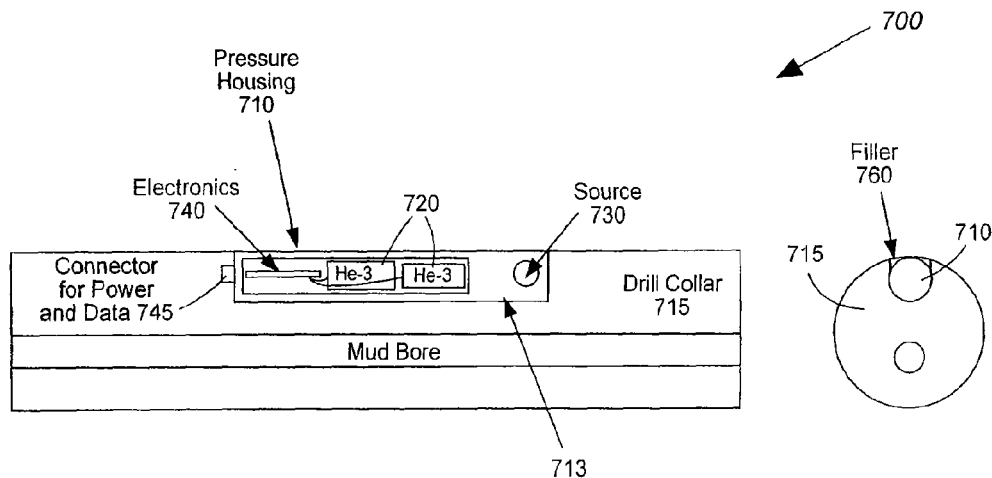
Fig.7A  Fig.7B

INTERCHANGEABLE MEASUREMENT HOUSINGS

RELATED APPLICATIONS

This application is a continuation-in-part application of U.S. application Ser. No. 12/445,552, filed on 23 Dec. 2009, which is a U.S. National Stage Filing under 35 U.S.C. 371 from International Application Number PCT/US2007/008959, filed 10 Apr. 2007, and published as WO 2008/123854 A1 on 16 Oct. 2008; which applications and publications are incorporated herein by reference in their entirety.

TECHNICAL FIELD

The present invention relates to systems for making measurements in a well.

BACKGROUND

In drilling wells for oil and gas exploration, understanding the structure and properties of the geological formation surrounding a borehole provides information to aid such exploration. However, the environment in which the drilling tools operate is at significant distances below the surface and measurements to manage operation of such equipment are made at these locations. The measurements typically depend on calibrated measurement devices used with the drilling tools to provide accurate data. Further, measurements are made with drilling tools of varying sizes. Prior to the application of a measurement device to different drilling tools, the measurement device is calibrated with respect to the drilling tool to be used. Configuring measurement devices can be time consuming when performed at the drilling site and calibration may not be possible at the drill site. Thus, what are needed are methods of making measurements in a well and measurement apparatus that provide for efficient operation with appropriate accuracy.

BRIEF DESCRIPTION OF THE DRAWINGS

Embodiments of the invention are illustrated by way of example and not limitation in the figures of the accompanying drawings.

FIG. 6 illustrates an embodiment of a system having a modular housing for a density measurement using a source that is configured on a drilling collar externally with respect to the modular housing.

FIG. 7A illustrates an embodiment of a system having a modular housing for a neutron-porosity measurement.

FIG. 7B shows a view of the embodiment of the system of FIG. 7A with the housing inserted in the drilling collar and filling material applied.

DETAILED DESCRIPTION

The following detailed description refers to the accompanying drawings that show, by way of illustration, various embodiments of the present invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
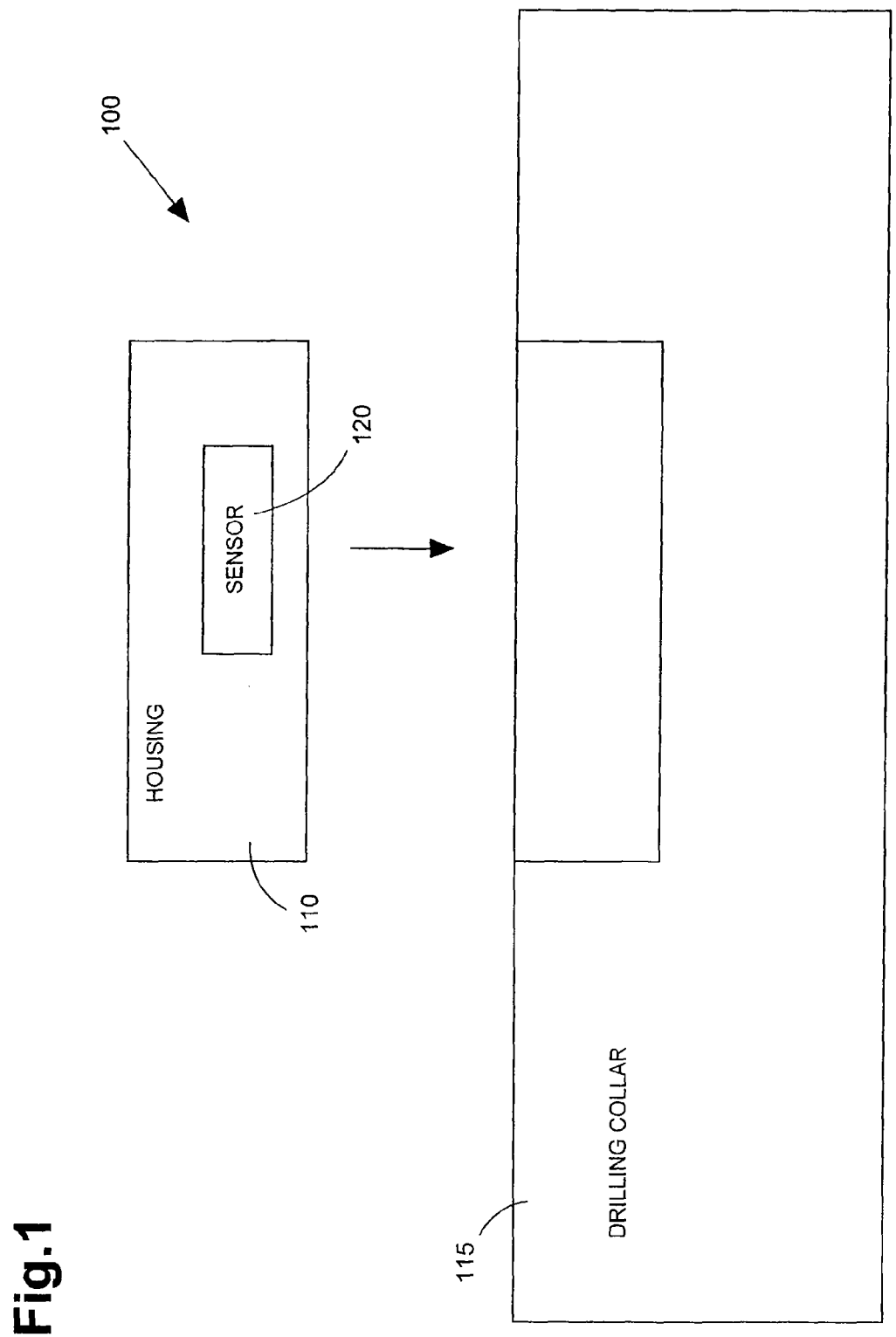
FIG. 1 shows an embodiment of a system for making measurements in a well while drilling.

FIG. 1 shows an embodiment of a system 100 for making measurements in a well while drilling. Such measurements may include formation and borehole measurements. System 100 may include a housing 110 arranged for placement with a drilling collar 115, where housing 110 may be structured as a modular unit of hardware to make measurements while drilling in a well. Housing 110 may be located on or in drilling collar 115. Housing 110 may include a sensor 120. Sensor 120 may be realized as a detector configured to receive a particular emanation from the well, based on the design of sensor 120. Sensor 120 may be configured to operate with a particular source that provides a signal to make measurements in the well. In various embodiments, housing 110 may be transferable to another drilling collar without a calibration with the transfer. Housing 110 may be transferred among drilling collars of different sizes.

In an embodiment, housing 110 may include a measurement source. In an embodiment, system 100 may include a measurement source external to housing 110 such that the measurement source has a fixed orientation to housing 110.

The fixed orientation may be determined to be a fixed distance from housing 110. Housing 110 may be configured with sources and/or sensors relatively open to the drilling environment. Housing 110 may be configured with a mechanism to shield sources and/or sources from the drilling environment, where the shielding mechanism is taken into consideration when determining properties of the drilling environment.

Housing 110 may be considered to be an apparatus or system that is part of a larger system that may include a collar in which the housing is disposed. System 100 may include electronics having information correlated to a calibration of the housing, where the information may be accessible for a transfer of housing 110 from one collar to another collar. The electronics may be located in housing 110. The electronics may be located separate from housing 110. System 100 may include a mechanism to convert measurements and calibration information to one or more formation or borehole properties. The calibration information may provide data to account for housing-to-housing and source-to-source variations. System 100 may include a mechanism, apparatus, and/or electronics to calibrate a combination of the housing and a measurement source.

Measurements to be made while drilling a well may include measurements of borehole and formation properties of the well. Borehole measurements relate to the borehole (also referred to as a wellbore) itself, including the openhole, which is the uncased portion of the well. Borehole may refer to the inside diameter of the wall of the wellbore. The wellbore wall is the rock face that bounds the drilled hole. Typically, formation refers to a body of rock that can be mapped. Such mapping may depend on the rock being continuous and sufficiently distinctive. Formation measurements relate to the rock around the borehole, typically including the volume of rock and the physical properties of this volume. A geological model may be employed to provide properties of the rock beyond the measurement.

Measurement of the properties of the well in the vicinity of the drilling point may be performed with various techniques. Conventional wireline tools allow measurement of one or more physical quantities in or around a well as a function of depth or time, where the logging or recording of data is taken down in the well with the log being transmitted back to the surface through a wireline and recorded at the surface. Wireline tools typically use single-strand or multi-strand wire or electrical cable to lower tools into the borehole to transmit data and are not used while drilling. Measurement-while-drilling (MWD) tools allow information to be transmitted to the surface or recorded while drilling down in the hole. MWD tools provide for evaluation of physical properties, typically borehole properties that generally include pressure, temperature, and borehole trajectory in three-dimensional space. Transmission techniques associated with MWD tools to send the information to the surface may use mud pulses, which are pressure pulses in a mud system. Mud typically relates to drilling fluid, which may include most fluids used in oil and gas drilling operations, where the fluids may contain significant amounts of suspended solids, emulsified water, or oil. Measurement of various properties in the well as a function of depth or time while drilling may also be performed using logging-while-drilling (LWD) tools.

LWD tools are measurement-while-drilling tools that also measure formation parameters such as resistivity, porosity, sonic velocity, and gamma ray. LWD tools may include devices and systems integrated into a bottomhole assembly that provide for the measurement of formation properties during hole excavation, or shortly thereafter. Use of LWD tools allows for the measurement of the properties before drilling fluids invade deeply into the well. LWD tools allow for measurements that may be difficult to attain with conventional wireline tools.

In a logging while drilling procedure, the drilling collar used may have a diameter close to the diameter of the drilling hole size so as to minimize the gap between a drilling collar and the hole wall. In various embodiments, measurement instrumentation for logging while drilling may be configured essentially to be popped, that is, quickly placed into these collars from the outside to facilitate, with relative ease, the movement of the instrumentation from one collar to another collar. This instrumentation may be switched among different size collars at the well site. Once logging is completed with one drilling collar, various embodiments of the instrumentation allow it to be quickly moved out of the collar in which the logging is completed and put into another drilling collar. The instrumentation may be constructed with tight machining tolerances with respect to the source area, the area of the drilling collars at which the instrumentation is to be located, and the fitting of such instrumentation to the drilling collar. Housing may be designed such that the relative spacing and orientation of the source and detectors remain substantially constant from collar to collar.

Various measurement tools use sensors in which the evaluation of a detected signal or event is conducted based on a calibration of the sensor with respect to a source that is used in providing the detected signal or event. The set of sensors and associated electronics may be arranged in a housing that may be placed on or in a drilling collar. With different drilling collars, the relationship of the drilling collar to the formation at the drilling location may vary among the different drilling collars. As a result, a housing used with a drilling collar has a relationship with the formation at the drilling location that is related to the drilling collar. In conventional drilling operations, each time a measurement housing is transferred to a different drilling collar, the measurement housing is recalibrated.

In various embodiments, housings are arranged with sensors relative to their associated sources such that once calibrated, the housings may be transferred to different drilling collars without performing a calibration after the transfer. Subsequent recalibration of the housing arrangement may be scheduled based on a time period since the last calibration. Such recalibration may be related to changes of the source and/or sensor properties over time. In various embodiments, during a transfer from one drilling collar to another drilling collar, information regarding the transfer can be supplied to electronics in the housing. The electronics may then use characteristics of the new housing location and collar geometry when evaluating the measured parameters received while drilling with the new drilling collar. Such a housing, with its associated measurement devices, may allow for efficient use of measurement equipment with different drilling collars at a drilling site. In various embodiments, a modular system of LWD measurement hardware may be constructed that can be moved from one drill collar to another, regardless of the collar size, without having to change the calibration. Application of such hardware may provide a relatively efficient system for making formation and borehole measurements in a well while drilling.

Figure 2:
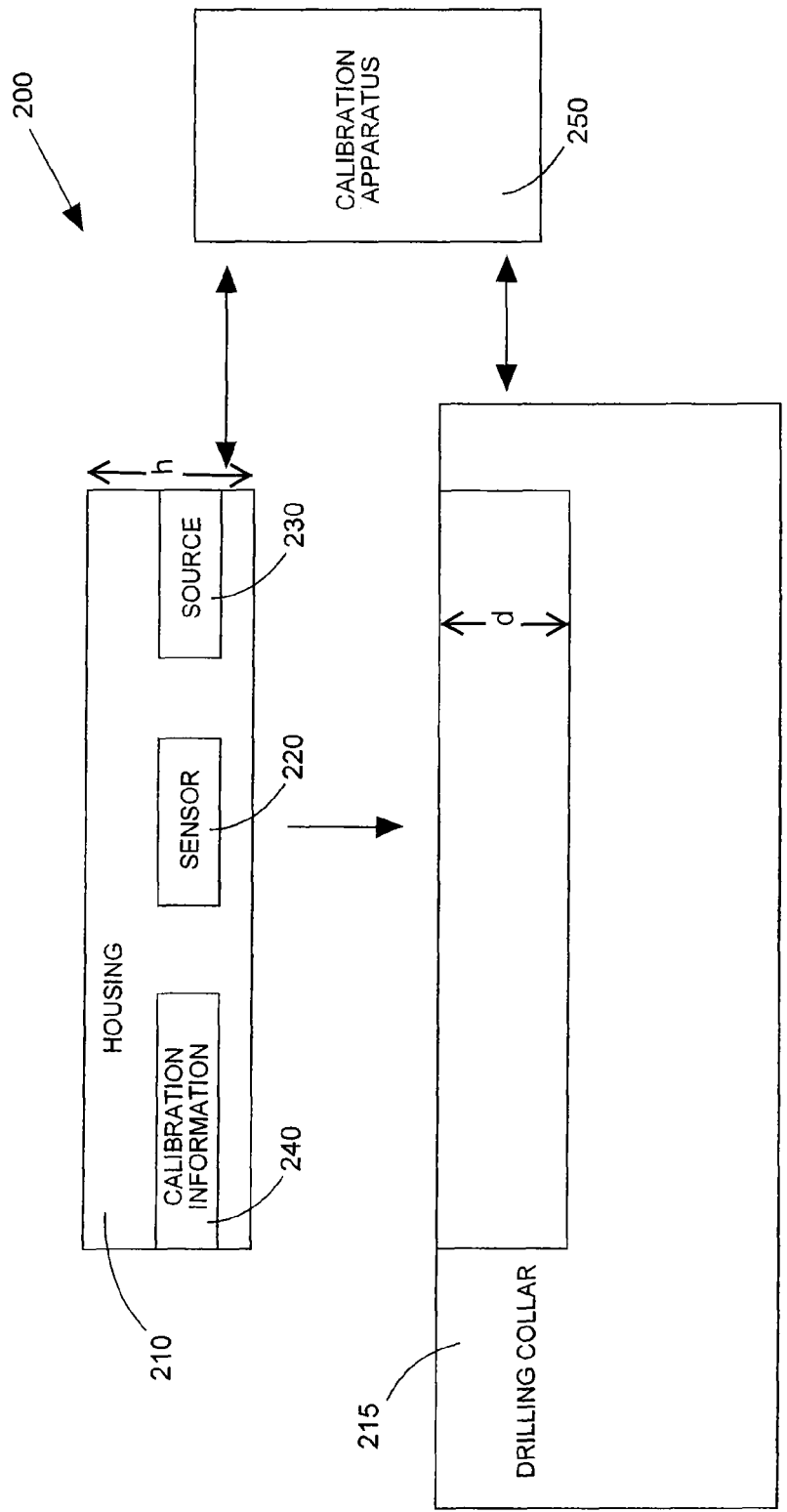
FIG. 2 illustrates features of an embodiment of a system having modular hardware that is used to make measurements of borehole and/or formation properties while drilling in a well.

FIG. 2 illustrates features of an embodiment of a system 200 having modular hardware that is used to make measurements of borehole and/or formation properties while drilling in a well. System 200 may include a collar 215, a calibration apparatus 250, a housing 210 that contains a sensor 220 and instrumentality 240 to apply calibrated housing measurements to generate one or more formation or borehole properties. System 200 is not limited to one housing that contains a sensor but may use multiple housings. The multiple housings may be attached at various locations along a string of drill pipes. Such a string of drill pipes may be referred to as a drill string. Each housing may contain one or more sensors. Each sensor may be designed to be sensitive to a form of radiation that passes through the borehole or formation. If the type of measurement employed uses a source of radiation generated from the measurement apparatus, such as source 230, it may be located in housing 210. By placing source 230 in housing 210, the source-to-detector spacing will remain fixed when transferring housing 210 to another drill-string element. The fixed source-to-detector spacing allows for the interchangeability of a housing between drill-string elements. Measurements may include sensing radiation or other form of emission that is naturally provided from the formation, where the emission is a function of the composition and structure of the formation.

Calibration apparatus 250 is used to calibrate housing 210 to account for housing-to-housing and source-to-source variations. The results may be stored in instrumentality 240 for providing calibration information. Instrumentality 240 may be realized as various devices that can be accessed to provide the calibration information when queried. Such devices may include electronic memories of various types. On transfer of housing 210 from one collar to another collar, the information may be used by instrumentality 240 to convert calibrated housing measurements to one or more formation or borehole properties. Instrumentality 240 may be realized using various forms of electronic devices arranged to perform various algorithms to generate data regarding one or more formation or borehole properties and store the data for future access or transmit the data to the surface. Instrumentality 240 may include a set of processors and a set of memories such that stored software in instrumentality 240 may be used to process various algorithms to generate and store formation or borehole properties. In an embodiment, calibration information and property data may be stored outside a housing. Such storage may be realized in another module on the collar or a module on another collar. Such storage may be realized in another housing on the drill string. A mud communication system or other system may used to transfer the information.

System 200 may include more than one collar 215 into which housing 210 can be placed. The collars may have different diameters. The housings 210 and collars 215 of system 200 may be designed so that one calibration can be used with a particular housing, regardless of the collar on which it is placed. The housing to collar arrangement may be constructed in various forms. In an embodiment, housing 210 may be disposed in an opening provided in collar 215 such that housing 210 does not extend beyond the collar surface. In such a configuration, an outer portion of housing 210 may be flush with the collar surface ($h \approx d$, h related to a thickness of housing 210 and d related to a depth of an opening or recess in collar which housing 210 can be inserted). Alternatively, an outer portion of housing 210 may be recessed from the collar surface ($h<d$). In another embodiment, housing 210 may be disposed in an opening provided in the collar such that housing 210 extends beyond the collar surface ($h>d$). In another embodiment, housing 210 may be disposed on the collar surface. Calibration may be performed on a scheduled basis. However, with housing 210 containing calibration information, such calibration need not be applied with the transfer of housing 210 from one collar to another collar of a different size.

Figure 3:
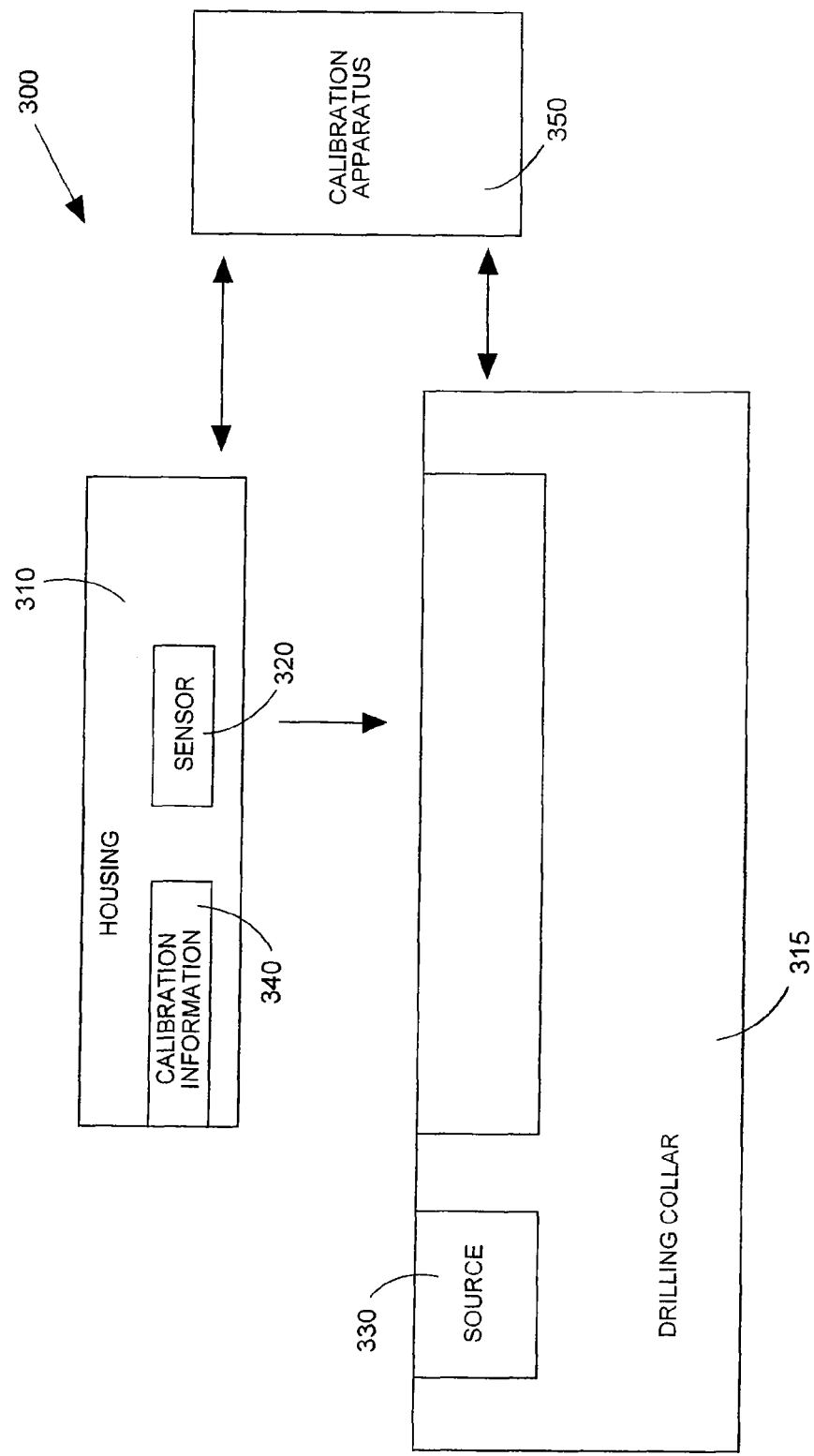
FIG. 3 illustrates features of an embodiment of a system having modular hardware that is used to make measurements of borehole and/or formation properties while drilling in a well.

FIG. 3 illustrates features of an embodiment of a system 300 having modular hardware that is used to make measurements of borehole and/or formation properties while drilling in a well. System 300 may include a collar 315, a calibration apparatus 350, a housing 310 containing a sensor 320 and instrumentality 340 to apply calibrated housing measurements to provide one or more formation or borehole properties. System 300 is not limited to one housing that contains a sensor but may use multiple housings. The multiple housings may be used at various locations along a drill string. Each housing may contain one or more sensors. Each sensor may be designed to be sensitive to a form of radiation that passes through the borehole or formation. In the embodiment as shown in FIG. 3, the type of measurement instrument uses a source of radiation and the source 330 is located in collar 315.

Calibration apparatus 350 may be employed to calibrate housing 310 to account for housing-to-housing and source-to-source variations. The results may be stored in various devices that can be accessed to provide the calibration information when queried. Such devices may include electronic memories of various types. On transfer of housing 310 from one collar to another collar, the information may be used by instrumentality 340 to convert calibrated housing measurements to one or more formation or borehole properties. Instrumentality 340 may be realized using various forms of electronic devices that may be arranged to perform various algorithms to generate data regarding one or more formation or borehole properties and store the data for future access or transmit the data to the surface. Instrumentality 340 may include a set of processors and a set of memories such that stored software in instrumentality 340 may be used to process various algorithms to generate and store formation or borehole properties. In an embodiment, calibration information and property data may be stored outside housing 310. Such storage may be realized in another module on the collar or a module on another collar. Such storage may be realized in another housing on the drill string. A mud communication system or other system may used to transfer the information.

System 300 may include more than one collar 315 into which housing 310 can be placed. The collars may have different diameters, each collar 315 having a source of radiation located in collar 315 rather than housing 310. The housings 310 and collars 315 of system 300 may be designed and constructed such that one calibration can be used with a particular housing, regardless of the collar on which it is attached. The housing to collar arrangement may be constructed in various forms. In an embodiment, housing 310 may be disposed in an opening provided in collar 315 such that housing 310 does not extend beyond the collar surface. In such a configuration, an outer portion of housing 310 may be flush with the collar surface. Alternatively, an outer portion of housing 310 may be recessed from the collar surface. In another embodiment, housing 310 may be disposed in an opening provided in the collar such that housing 310 extends beyond the collar surface. In another embodiment, housing 310 may be disposed on the collar surface. Calibration may be performed on a scheduled basis; however, with housing containing calibration information, such calibration need not be applied with the transfer of housing 310 from one collar to another collar of a different size.

In various embodiments, the modular measurement systems may include density measurement systems, neutron porosity measurement systems, ultrasonic standoff measurement systems, a system having a resistivity imaging device, other measurement systems, or combinations of measurement systems. Configurations, such as ones having applications providing density and neutron-porosity measurements, may include techniques to ensure that the source being used does not become dislodged from the drilling tool/measurement arrangement. A configuration, such as illustrated in FIG. 3 in which source 330 may be securely fastened to collar 315, provides a mechanism to protect source 330. Tighter machining tolerances to enable the transportability of calibrations may be associated with modular measurements systems of FIG. 3 as compared to FIG. 2.

Calibrations of the various embodiments of modular measurement systems may be performed with the housing in a collar, by itself, or in a holder that acts as a small collar. If a source is not mounted in the housing, a holder may be used to hold the source and housing in the proper configuration. The parameters obtained from the calibration process may be stored in the housing electronics, so that they are readily available whenever that housing is used.

In various embodiments, the measurement housing is generally cylindrical in shape, though other shapes may be used. The measurement housing may be inserted into a slot machined into the outside of the drill collar. The area of the housing over the sensors and exit location of source radiation may be exposed directly to the drilling fluid to reduce sensitivity to details of the collar. The sensor and exit location may be shielded from the drilling fluid, where the initial and periodic calibration takes into account details common to a set of collars that may be utilized with the modular measurement housing.

Figure 4A:
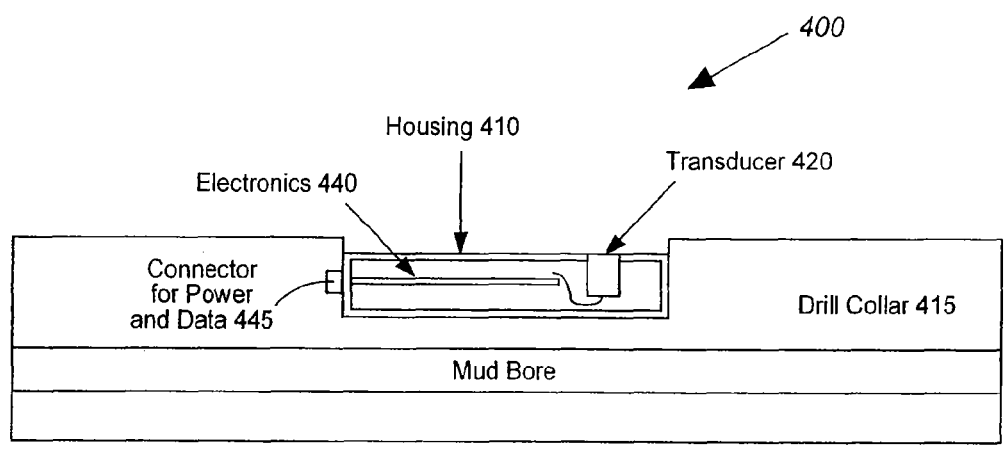
FIG. 4A illustrates an embodiment of a system having a modular housing for an ultrasonic-standoff measurement.

FIG. 4A illustrates an embodiment of a system 400 having a modular housing 410 for an ultrasonic-standoff measurement. Housing 410 may be configured to withstand pressures associated with drilling at large depths from the surface. Measurement housing 410 may be inserted into a slot in a drill collar 415. An ultrasonic transducer 420 may be mounted into the wall of pressure housing 410 so that it forms a pressure seal between the inside and outside of the pressure housing 410. Conventional sealing apparatus such as an o-ring seal may be used to implement the pressure seal. A gap of about half to three-quarters of an inch may exist between the top of transducer 420 and the outer diameter of drill collar 415. Transducer 420 may be attached electrically to electronics 440 that both excite transducer 420 and process received signals. System 400 may include a connector 445 for power and data. Drill collar 415 may also contain a hole drilled axially through it to allow the passage of drilling mud.

Periodically (e.g. every 5 msec) electronics 440 may supply a large voltage pulse to transducer 420, which causes transducer 420 to vibrate and emit ultrasonic waves into the mud surrounding drill collar 415. The waves eventually propagate to the formation wall, which reflects part of the energy back to transducer 420. When struck by the reflected wave, transducer 420 vibrates again, which generates a voltage signal that is detected by electronics 440.

After transducer 420 is pulsed to generate the ultrasonic wave, it continues to vibrate for some time. Such vibration induces a signal in the receiving electronics 440, just as it does when activated by a reflected pulse. Since this "ring down" can be very large, no reflection can be detected until it has decayed significantly. To ensure that this happens, transducer 420 may be recessed below the outer diameter of drill collar 415. This arrangement provides a time buffer that is twice as long as the time it takes the pulse to travel the recessed distance. Generally, about half to three-quarters of an inch is adequate for the amount of recess.

The time between when transducer 420 is pulsed by electronics 440 and when the return signal is detected is recorded. That time is linearly related to twice the distance between the outer surface of transducer 420 and the borehole wall. The linear portion of the relationship depends on the speed of the ultrasonic pressure pulse in the fluid, which can be estimated from the known constituents of the mud or determined with another measurement. The offset in the linear relationship depends on details of electronics 440 and transducer 420, as well as the distance that transducer 420 is recessed below the outer diameter of drill collar 415. This offset may be determined from a calibration procedure.

In an embodiment, the distance that transducer 420 is recessed below the outer diameter of drill collar 415 is made the same for all collars. If the offset measurement is calibrated while housing 410 is in collar 415, such measurement ensures that the calibration will be valid for any collar in which housing 410 is placed. If the offset measurement is calibrated outside of collar 415, the calibration values can be adjusted to account for the change in offset that will occur when housing 410 is placed in collar 415. Since that change will be the same for all collars, the calibration may be used for all collars. Alternatively, the recession can be measured when housing 410 is placed in collar 415 and used as an input to the processing software, so that the calibration can be altered in a known fashion without having to repeat the calibration procedure. The above example illustrates system 400 having a single transducer 420 used in pulse-echo mode. The features discussed in the above example may also apply to system 400 having two detectors configured in housing 410 and used in a pitch-catch mode (one transducer sends and the other receives). The features discussed in the above example may also apply to system 400 configured with more than one pulse-echo transducer 420.

Figure 4B:
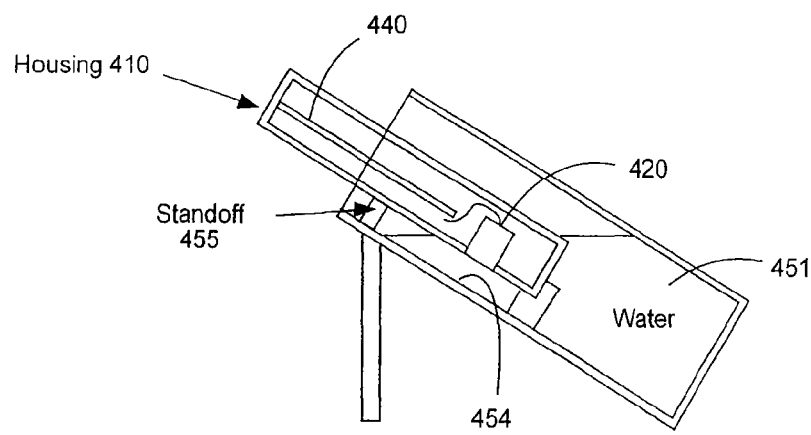
FIG. 4B illustrates an embodiment of an arrangement to calibrate a housing to a collar which may be used in association with an ultrasonic-standoff measurement.

FIG. 4B illustrates an embodiment of an arrangement to calibrate housing 410, which may be used in association with an ultrasonic-standoff measurement. The measurement housing 410 can be calibrated while in collar 415 using techniques that are well known in the art or it can be calibrated by removing housing 410 from drill collar 415. If the latter procedure is performed, housing 410 may be calibrated by immersing housing 410, using standoff 455, in a bath of water 451 with a reflecting surface 454 a known distance away from housing 410, as shown in FIG. 4B. Standoff 455 may be constructed to simulate the standoff for the drilling tool in a well, which is the distance between the drilling tool and the formation.

Figures 5A, 5B:
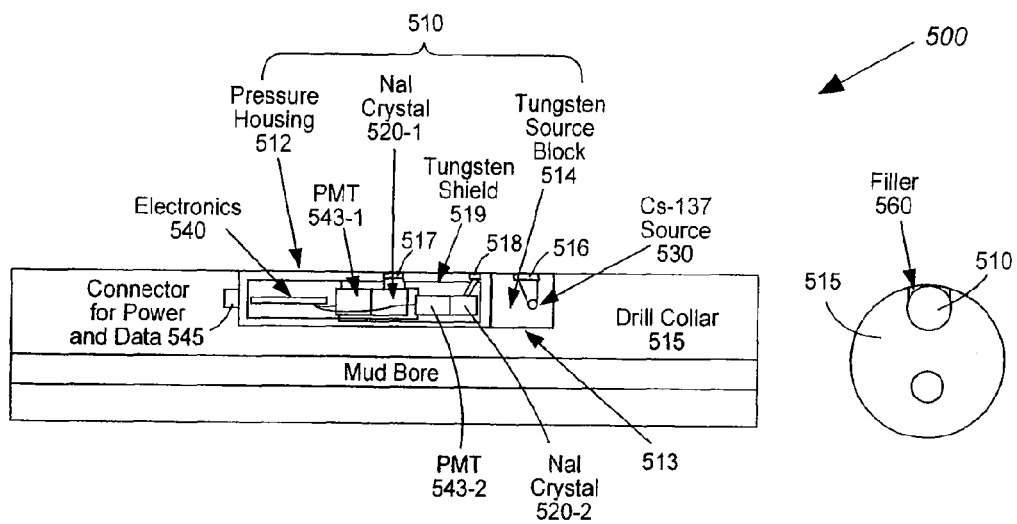
FIG. 5A illustrates an embodiment of a system having a modular housing for a density measurement.
FIG. 5B shows a view of the embodiment of the system of FIG. 5A with the housing inserted in the drilling collar and filling material applied.

FIG. 5A illustrates an embodiment of a system 500 having a modular housing 510 for a density measurement. The measurement housing 510 may be inserted into a slot 513 in a drill collar 515. Housing 510 may be structured in various arrangements. As shown in FIG. 5A, housing 510 may include two pieces, or two sections, that are attached together. One section may be a pressure housing 512 that holds detectors 520-1, 520-2 and electronics 540. Another section may include a tungsten source block 514 that holds a source 530. Source 530 may be cesium-137. Gamma rays may pass from source 530 through a collimator and a relatively low-density window 516 mounted in the front of the housing. Window 516 may be a titanium window or other window of appropriate material. Window 516 keeps fluids from passing into the source cavity. The gamma rays that leave the housing 510 scatter in the formation with some of the gamma rays redirected back towards housing 510. Of these gamma rays redirected back towards housing 510, some pass through the windows 517 and 518 over the detector collimators, through the collimators, and into the detectors 520-1 and 520-2. Detectors 520-1, 520-2 may be NaI crystals, which convert the gamma rays to light. Detectors 520-1, 520-2 are not limited to using NaI crystals, but may employ other appropriate materials. Window 518 over detector 520-2 may be a beryllium oxide window and window 517 farther from source 530 may be a titanium window. The windows in housing 510 are not limited to the abovementioned materials, but may be composed of other appropriate materials. Detectors 520-1 and 520-2 may be coupled to photomultiplier tubes (PMTs) 543-1 and 543-2, respectively, which convert light from the detectors into electronic signals. A tungsten shield 519 may be used to cover detectors 520-1, 520-2. Tungsten shield 519 may also be used to cover other various electronics in pressure housing 512. The signals are processed by the electronics 540 to produce count rates representative of the number of gammas detected within various energy ranges for each detector 520-1, 520-2. These count rates may then be converted to formation and borehole properties using various techniques known in the art. System 500 may include a connector 545 for power and data.

Housing 510 fits into a pocket machined into the outside of the drill collar 515. Various means of holding housing 510 in place may be used. Use of redundant securing methods may be used so that source 530, with the attachment of housing 510, remains in collar 515 under all circumstances. FIG. 5B shows a view of drilling collar 515 with housing 510 inserted and filling material 560 applied. Any gaps around the top of the tool in the vicinity of source 530 and detectors 520-1, 520-2 may be filled with material to keep drilling mud out, since variations in the mud properties may affect the log. However, filling material 560, which may also act as a clamp, should not cover the windows. Since the effects of filling material 560 on the measurements will be small with windows not covered by filler material 560, the effects can be predicted with sufficient accuracy based on the size of the collar 515. If filling material 560 covers the windows, calibration may be used to account for filling material 560. Sufficient shielding may be placed in housing 510 so that gamma rays cannot enter from the back or sides of the housing 510 in large enough quantities to distort the measurement, regardless of, to which collar housing 510 is secured.

Figures 5C, 5D:
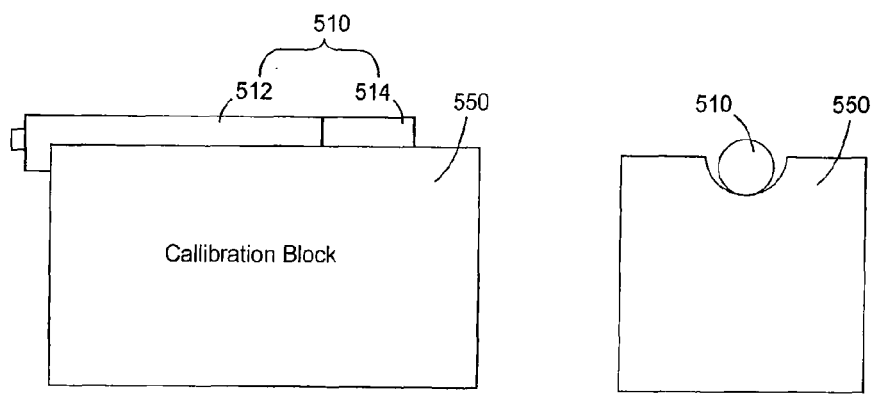
FIGS. 5C-D illustrate two views of a housing of a system such as the system of FIG. 5A in a calibration block.

FIGS. 5C-D illustrate two views of housing 510 in a calibration block 550. This calibration configuration, with housing 510 placed directly into calibration blocks 550 for calibrating, may be used if housing 510 does not rely on back and side shielding from drilling collar 515. Alternatively, housing 510 may be calibrated while inside collar 515 using standard techniques.

FIG. 6 illustrates an embodiment of a system 600 having a modular housing 610 for a density measurement using a source 630 that is configured on a drilling collar 615 externally with respect to modular housing 610. The measurement housing 610 may be inserted into a slot 613 in a drill collar 615. Housing 610 may be structured in various arrangements. Housing 610 holds detectors 620-1, 620-2 and electronics 640. A tungsten shielding 614 separates housing 610 from source 630 that is independently secured to collar 615. Source 630 may be cesium-137. Gamma rays may pass from source 630 through a collimator and a relatively low-density window 616 mounted in the front of the housing. Window 616 may be a titanium window or other window of appropriate material. Window 616 keeps fluids from passing into the source cavity. The gamma rays that leave the housing 610 scatter in the formation with some of the gamma rays redirected back towards housing 610. Of these gamma rays redirected back towards housing 610, some pass through the windows 617 and 618 over the detector collimators, through the collimators, and into the detectors 620-1, 620-2. Detectors 620-1, 620-2 may be NaI crystals, which convert the gamma rays to light. Detectors 620-1, 620-2 are not limited to using NaI crystals, but may employ other appropriate materials. Window 618 over detector 620-2 may be a beryllium oxide window and window 617 farther from source 630 may be a titanium window. The windows in housing 610 are not limited to the abovementioned materials, but may be composed of other appropriate materials. Detectors 620-1 and 620-2 may be coupled to PMTs 643-1 and 643-2, respectively, which convert light from the detectors into electronic signals. A tungsten shield 619 may be used to cover detectors 620-1, 620-2. Tungsten shield 619 may also be used to cover other various electronics in pressure housing 610. The signals are processed by the electronics 640 to produce count rates representative of the number of gammas detected within various energy ranges for each detector 620-1, 620-2. These count rates may then be converted to formation and borehole properties using various techniques known in the art. System 600 may include a connector 645 for power and data.

In an embodiment, housing 610 with externally configured source 630 may be configured similar to housing 510 of FIG. 5A except that source 630 is secured directly to drilling collar 615. Source 630 may be screwed directly into collar 615. Sufficient shielding, such as tungsten shielding 614, may be placed between source 630 and detectors 620-1, 620-2 to prevent a significant number of gamma rays from traveling in a straight line from source 630 to detectors 620-1, 620-2. In an embodiment, source collimator and windows 616, 617, and 618 are machined almost identically for each collar. In a similar manner, slot 613 for housing 615 is positioned almost identically relative to source 630 for each collar. As of result of the common orientation of source 630 relative to housing 610 and common materials used, measurements with the same housing and source will essentially be identical from collar to collar. Housing 610 may be calibrated in a similar fashion as housing 510 with the position of source 630 included in the calibration.

FIG. 7A illustrates an embodiment of a system 700 having a modular housing 710 for a neutron-porosity measurement. Measurement housing 710 may be inserted into a slot 713 in a drill collar 715. Housing 710 may include a neutron source 730, neutron detectors 720, and electronics 740. Neutron source 730 may be Cf-252, a mixture of Am-241 and beryllium, a particle accelerator that generates neutrons, or other source that generates neutrons. Detectors 720 may be tubes filled with He-3 gas. Detectors 720 may include lithium-doped glass connected to photomultiplier tubes. Detectors 720 may include other materials for neutron detection. Neutrons pass from source 730 through housing 710 and out into the surrounding mud and formation. Some of the neutrons are redirected back towards housing 710. Of these neutrons that are redirected back towards housing 710, some pass into the detectors 720. Detectors 720 convert the neutrons into electronic signals, which are processed by electronics 740 to produce count rates representative of the number of neutrons detected by each detector 720. These count rates can then be converted to formation and borehole properties using various techniques as are known in the art. System 700 may include a connector 745 for power and data.

Housing 710 fits into a pocket 713 machined into the outside of the drill collar 715. Various means of holding housing 710 in place are possible, and redundant methods may be utilized so that source 730 in housing 710 remains in collar 715 under all circumstances. FIG. 7B illustrates an embodiment including the application of filler material 760 to the attachment of housing 710 to drill collar 715. Any gaps around the top of the tool in the vicinity of source 730 and detectors 720 should be filled with filler material 760 to keep drilling mud out, since variations in the mud properties may affect the log. The effects of filling material 760 on the measurements may be small and can be predicted with sufficient accuracy based on the size of the collar. Due to the nature of neutron transport, the measurement may not be totally shielded from neutrons entering the back or sides of the housing. Consequently, the measurement may be sensitive to the size of the collar to some degree. This sensitivity may be characterized for each collar size and accounted for by processing.

Figure 7C:
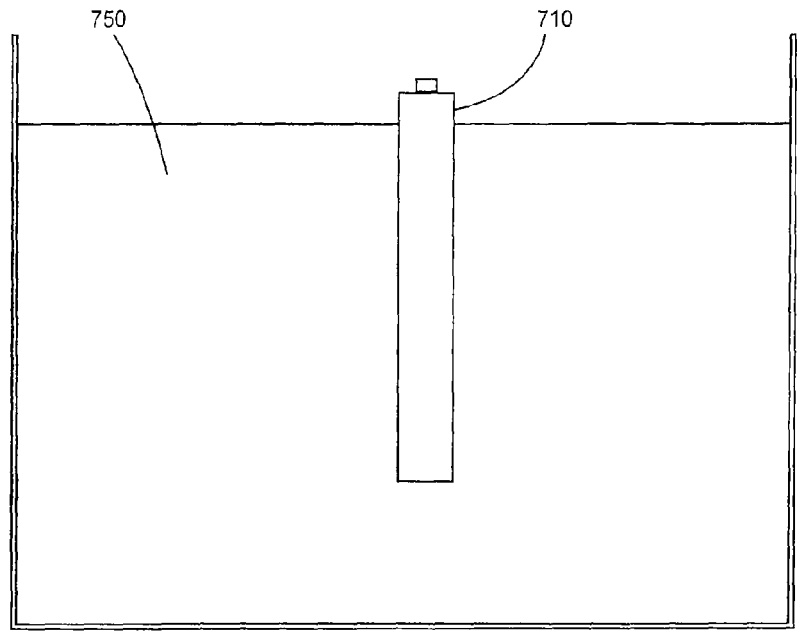
FIG. 7C illustrates an embodiment of a housing of a system such as the system of FIG. 7A in a calibration bath.

FIG. 7C illustrates an embodiment of housing 710 in a calibration bath 750. Calibration bath 750 may be a large water bath. Alternatively, housing 710 may be calibrated while inside collar 715 using standard techniques.

Figure 8:
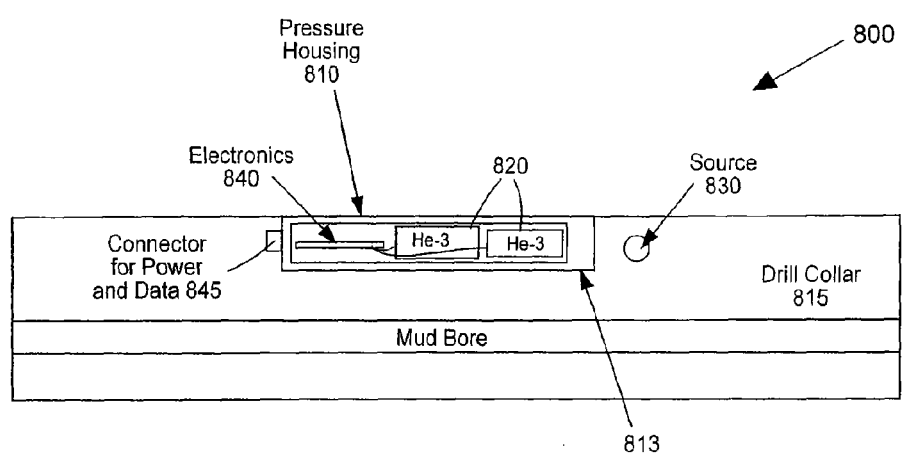
FIG. 8 illustrates an embodiment of a system having a modular housing for a neutron-porosity measurement using a source that is configured on a drilling collar externally with respect to the modular housing.

FIG. 8 illustrates an embodiment of a system 800 having a modular housing 810 for a neutron-porosity measurement using a source 830 that is configured on a drilling collar 815 externally with respect to modular housing 810. The measurement housing 810 may be inserted into a slot 813 in a drill collar 815. Housing 810 may be structured in various arrangements. Housing 810 may include neutron detectors 820 and electronics 840. Neutron source 830 may be Cf-252, a mixture of Am-241 and beryllium, a particle accelerator that generates neutrons, or other source that generates neutrons. Detectors 820 may be tubes filled with He-3 gas. Detectors 820 may include lithium-doped glass connected to photomultiplier tubes. Detectors 820 may include other materials to neutron detection. Neutrons pass from source 830 through drill collar 815 and out into the surrounding mud and formation. Some of the neutrons are redirected back towards housing 810. Of these neutrons that are redirected back towards housing 810, some pass into the detectors 820. Detectors 820 convert the neutrons into electronic signals, which are processed by electronics 840 to produce count rates representative of the number of neutrons detected by each detector 820. These count rates can then be converted to formation and borehole properties using various techniques as are known in the art. System 800 may include a connector 845 for power and data.

In an embodiment, housing 810 with externally configured source 830 may be configured similar to housing 710 of FIG. 7A except that source 830 is secured directly to drilling collar 815. Source 830 may be screwed directly into collar 815. Source 830 is positioned at the same depth below the outer diameter of collar 815 for all collars. Slot 813 for housing 810 is positioned almost identically relative to source 830 for each collar. As of result of the common position of source 830 relative to housing 810, measurements with the same housing 810 and source 830 will essentially be identical from collar to collar. Housing 810 may be calibrated in a similar fashion as housing 710 with the relative position of source 830 included in the calibration.

Figure 9:
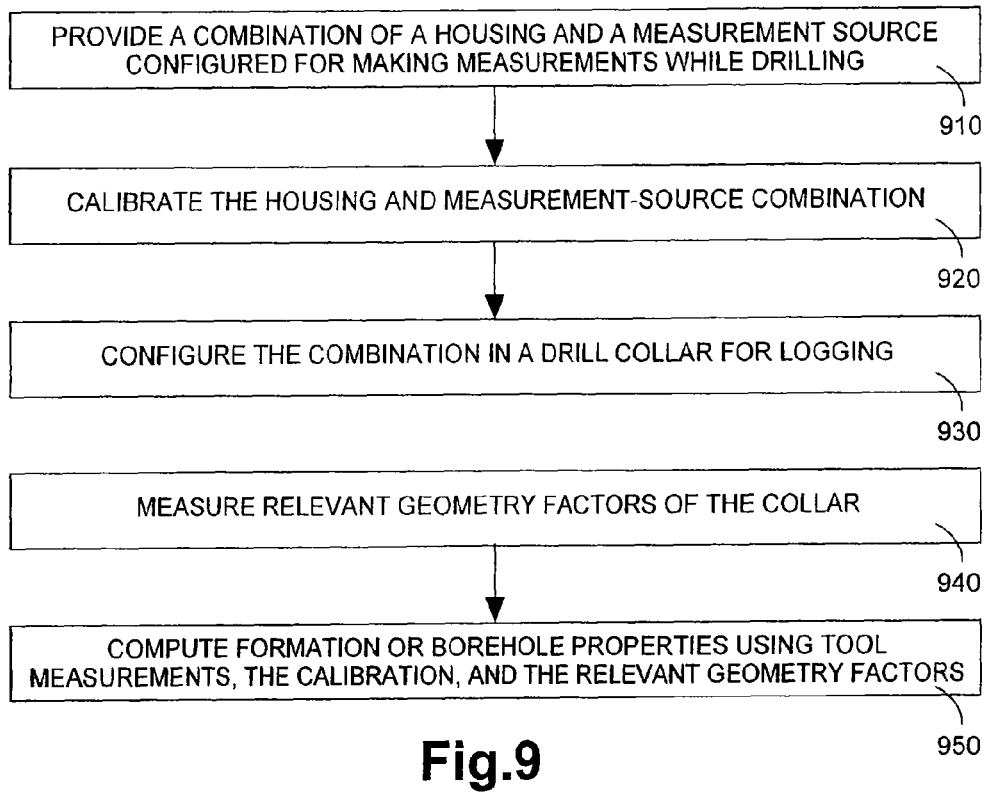
FIG. 9 shows features of an embodiment of a method for calibrating a modular housing that is transferable among drilling collars without calibration and computing formation or borehole properties.

FIG. 9 shows features of an embodiment of a method for calibrating a modular housing that is transferable among drilling collars without calibration and computing formation or borehole properties. At 910, a combination of a housing and a measurement source configured for making measurements while drilling is provided. The housing may be configured in accordance with any of the housings discussed with respect to FIGS. 1-8 or other embodiment. The housing may be arranged as an ultrasonic-standoff measurement tool, a density measurement tool, a neutron-porosity measurement, a tool to measure other borehole and formation properties, or various combinations of measurement tools. Such housing may include, but is not limited to, one or more sensors and electronics, where the electronics may be structured to store calibration information and to convert measurements and calibration information to one or more formation or borehole properties. For a modular housing for a measurement tool in which emanations from a formation are measured without using an active source, the calibration instrument may be constructed to include features to calibrate the measurement tool. For a modular housing for a measurement tool using an active source, the source may be secured to the housing with a measured or known position of the source relative to the sensor of the housing. For a modular housing for a measurement tool using an active source, the source may be external to the housing and secured in the calibration tool with known position to the housing and/or the sensor of the housing based on the arrangement common to the drilling collars to which the housing may be transferred.

At 920, the combination of the housing and the measurement source are calibrated. The results of the calibration may be stored in the electronics of the housing and used in transferring the housing among different drilling collars without calibrating after the transfer. Alternatively, the results of the calibration may be stored at another location accessible to provide transfer of the housing from one drilling collar to another without recalibrating. It may not be stored in the particular housing that the data is acquired, but at another associated location. At whatever location on a drilling string the information is stored, the location may be selected such that the calibration information is always available to the measurement housing and/or data evaluation housing.

At 930, the combination of housing and measurement source may be configured for logging. At 940, relevant geometry factors of the collar may be measured. The relevant geometry factors of the collar may be stored in a memory. At 950, formation or borehole properties are computed using tool measurements, the calibration, and the relevant geometry factors.

The drilling collars associated with the housing transfer may be of different sizes. For measurement techniques in which the drilling collar size is a parameter, such as a neutron tool, the calibration may be conducted to account for varying collar sizes with the resultant data stored in the electronics associated with the housing. During transfer, the size of the drilling collar to which the housing is being attached may be entered as data input into the associated electronics. With the collar size dialed into the electronics, the software within the housing may account for collar size in the algorithms that are used in the measurements. These algorithms may be stored and controlled in the associated electronics.

The calibrations take into account the strength of the source used in the measurement and the variation of the source strength with time. Each type of housing measurement may have a different design for the different measurements and may be calibrated independently from other types of measurement housings. The formation-property or borehole-property calculations take into account variations associated with the features of the type of measurement tool for which the housing is configured. The calibration may be performed to essentially make all tools look like the standard tools. All the measurements made in calibration with a given tool may be mapped to a standard tool. The algorithms associated with the measurement tool then map the standard tool to the formation properties. The calibration may be made periodically or at random times such that the housing measurement does not need to be calibrated with the transfer among different drilling tools.

Figure 10:
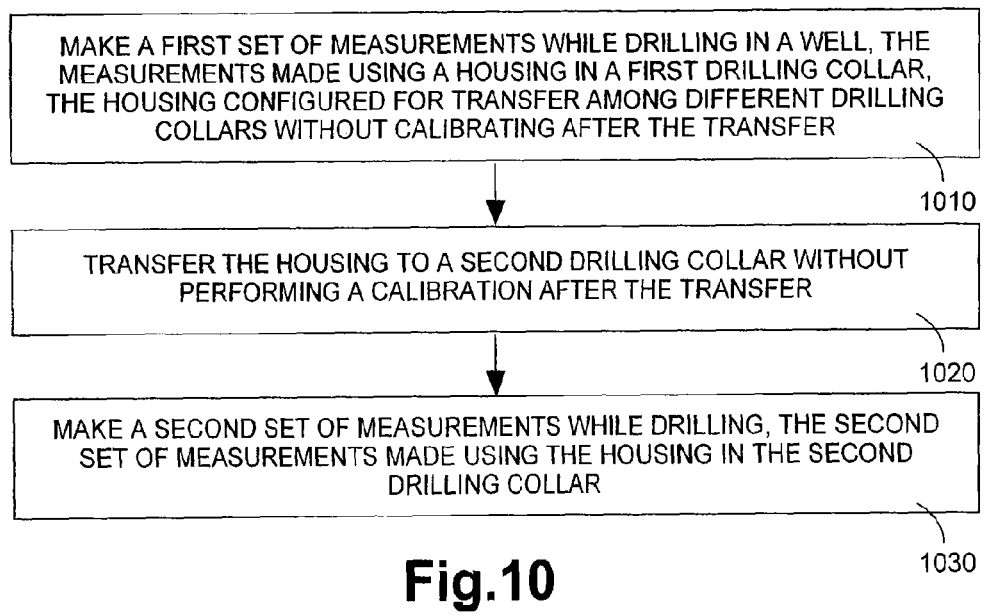
FIG. 10 shows features of an embodiment of using a modular measurement housing among drilling collars without calibration.

FIG. 10 shows features of an embodiment of using a modular measurement housing among drilling collars without calibration. At 1010, a first set of measurements while drilling in a well is made. The measurements may be conducted using an embodiment of a modular housing attached to first drilling collar, where the housing is configured for transfer among different drilling collars without calibrating after the transfer. The measurements may include borehole measurements, formation measurements, or combinations thereof.

At 1020, the housing is transferred to another drilling collar without performing a calibration after the transfer. In some embodiments, the transfer may be performed such that the housing is transferred to a drilling collar that is of a size different from the previous drilling collar to which the housing was attached. Information stored in the housing may be accessed and applied to account for differences due to transferring the housing to a second drilling collar.

At 1030, another set of measurements is made while drilling, where this set of measurements is made using the housing in the drilling collar to which the housing is transferred. The measurements may include borehole measurements, formation measurements, or combinations thereof.

Various embodiments of modular housings may include any form of machine-readable medium that has executable instructions to collect calibration information, to store calibration information, to apply calibration information to the transfer of the housing from one drill collar to another without recalibration of the measurement housing, and/or to convert measurements and calibration information to one or more formation or borehole properties. The machine-readable medium may include instructions to make measurements while drilling using a set of drilling collars to which the housing may be attached. The machine-readable medium is not limited to any one type of medium. The machine-readable medium used may depend on the application using an embodiment of a modular housing configured to transfer among drilling collars without recalibration. The machine-readable medium may be realized as a computer-readable medium.

In various embodiments, sensor housings may be designed such that the relative spacing and orientation of sources and detectors can vary from drill-string element to drill-string element, such as from collar to collar, with the sensor housings transferable from a drill-string element to another drill-string element without a calibration measurement during or after the transfer. Such an arrangement can be realized using calibration coefficients stored in a data storage unit. Features of a method of transferring a sensor housing can include transferring a sensor housing from a drill-string element to another drill-string element, the sensor housing containing a detector, the sensor housing being a modular unit of hardware to make measurements in a well; and maintaining calibration coefficients in a data storage unit such that the transfer of the sensor housing is conducted without a calibration measurement during or after the transfer, the calibration coefficients operable to be applied by a processor relative to a measurement reading from the detector. The calibration coefficients can include calibration data of the detector in the sensor housing and calibration data of a source with respect to a mounting of the source. The system calibration data of the source can include data correlated to mounting positions of the source in drill collars such that source position relative to the detector or to the sensor housing can vary between different drill-string elements to which the sensor housing is transferred. The system calibration data of the source can include data obtained by calibrating the drill collar with a reference housing and a reference source.

In various embodiments, a system comprises a sensor housing containing a detector and a processor operable with respect to the sensor housing or detector such that the sensor housing is transferable from a drill-string element to another drill-string element without a calibration measurement during or after the transfer. The sensor housing can be structured to be arranged for placement with a drill-string element, the sensor housing being a modular unit of hardware to make measurements in a well. The processor can be structured to apply calibration coefficients from a data storage unit relative to a measurement reading from the detector such that the sensor housing is transferable to another drill-string element without a calibration measurement during or after the transfer. The calibration coefficients can include calibration data of the detector in the sensor housing and calibration data of a source with respect to a mounting of the source. The calibration data of the source can include data correlated to mounting positions of the source in drill collars such that source position relative to the detector or to the sensor housing can vary between different drill-string elements to which the sensor housing is transferred. The calibration data provides a mechanism to adjust for these variations of the source position relative to the detector or to the sensor housing in transferring from one drill-string element to another drill-string element.

Each of the processor and the data storage unit can be realized in a number of different arrangements or architectures. The processor can be realized as a set of one or more processors. The processor can be disposed in the sensor housing. The processor can be disposed in a drill-string element different from the drill-string element to which the sensor housing is mounted. The processor can be disposed in electronics located aboveground at a drilling site. The processor can be disposed located remotely and networked with electronics associated with the sensor housing at a drilling site. The data storage unit can be disposed in the sensor housing. The data storage unit can be disposed in a drill-string element different from the drill-string element to which the sensor housing is mounted. The data storage unit can be disposed in electronics located aboveground at a drilling site. The data storage unit can be disposed located remotely and networked with the processor or electronics associated with the sensor housing at a drilling site. The data storage unit may be integrated with the processor in a common housing.

The data storage unit can be realized as machine-readable storage device. A machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices. The data storage unit can include a database containing calibration data.

The sensor housing can be calibrated for a number of different detectors. These different detectors can be calibrated for a number of different mountings in the sensor housing. In addition, for each detector, calibration data can be obtained and stored in the data storage unit for a sources mounted in different locations. These different locations can include positions in the sensor housing, positions in a drilling collar for each of a set of drilling collars to which the sensor housing can be mounted, positions in a drilling collar for each of a set of drilling collars for these drilling collars being different than a drilling collar to which the sensor housing can be mounted.

The calibration coefficients can include calibration data of the sensor housing with respect to a plurality of different drill-string elements. The plurality of different drill-string elements can include drill-string elements of different sizes. The calibration coefficients can include calibration data of the sensor housing with respect to a plurality of placements of the sensor housing in a recess of a drilling collar. The calibration coefficients include calibration data of the sensor housing in the recess with the sensor housing completely below an outer surface of the drilling collar. The calibration coefficients can include calibration data of the sensor housing in the recess with the sensor housing extending outside an outer surface of the drilling collar. The calibration coefficients can include calibration data of the sensor housing in the recess with the sensor housing flush with an outer surface of the drilling collar. The calibration coefficients can include calibration data of the sensor housing with respect to placement in a recess of a drilling collar in a drill string and calibration data with a source disposed in a different drill collar in the drill string. The calibration coefficients can include calibration data associated with the sensor detecting natural emanations from a formation. The natural emanations can include gamma radiation.

The system can include a measurement source external to the sensor housing, where the measurement source has a distance to the sensor housing, the calibration coefficients selectable based on the distance. The sensor housing can include a density measurement tool. The sensor housing can include a neutron porosity measurement tool. The sensor housing can include an ultrasonic standoff measurement tool.

In various embodiments, components of a system operable with a sensor housing transferable from a drill-string element to another drill-string element without a calibration measurement during or after the transfer, as described herein or in a similar manner, can be realized in combinations of hardware and software based components. These components can include a machine-readable storage device having machine-executable instructions, such as a computer-readable storage device having computer-executable instructions, to allow transfer of a sensor housing from a drill-string element to another drill-string element without a calibration measurement during or after the transfer. Executed instructions can also include instructions to make measurements in a well. Executed instructions can include instructions to perform operations, the operations comprising operations to: engage, with respect to calibration data, in a transfer process of a sensor housing from a drill-string element to another drill-string element, the sensor housing containing a detector, the sensor housing being a modular unit of hardware to make measurements in a well; and to maintain calibration coefficients in a data storage unit such that the transfer of a sensor housing is conducted without a calibration measurement during or after the transfer, the calibration coefficients operable to be applied by a processor relative to a measurement reading from the detector.

The instructions to engage in a transfer process of a sensor housing from a drill-string element to another drill-string element can include, but are not limited to, instructions to communicate with or generate a signal to a user interface requesting identification of the drill-string element to which the sensor housing is being transferred. The instructions can include instructions to operate in response to a received signal identifying a drill-string element to which a sensor housing is being transferred. The instructions can include instructions to operate in response to a received signal having data associated with a drill-string element to which a sensor housing is being transferred, the sensor housing being transferred, or combinations thereof. Other mechanisms to identify the drill-string element to which the sensor housing is being transferred can be implemented to generate instructions associated with engaging in the transfer of the sensor housing without a calibration measurement during or after the transfer. The identification of the drill-string element can be used to access the data storage unit to obtain calibration coefficients for the drill-string element to which the sensor housing is being transferred and may include other data or other calibration coefficients associated with the measurement application to which the sensor housing is being used. The operations to engage in transferring the sensor housing can include accessing the data storage unit to load calibration coefficients in electronics of the sensor housing. This access may be accomplish by automatic generation of a signal upon inserting the sensor housing in the drill-string element. The signal may be generated by sensors appropriately placed in the drill-string element. Such a signal can include identification of the drill-string element. The instructions can include instructions to provide data to a data processing unit such that the data processing unit conducts one or more processes to evaluate signals, data, or signals and data.

Figure 11:
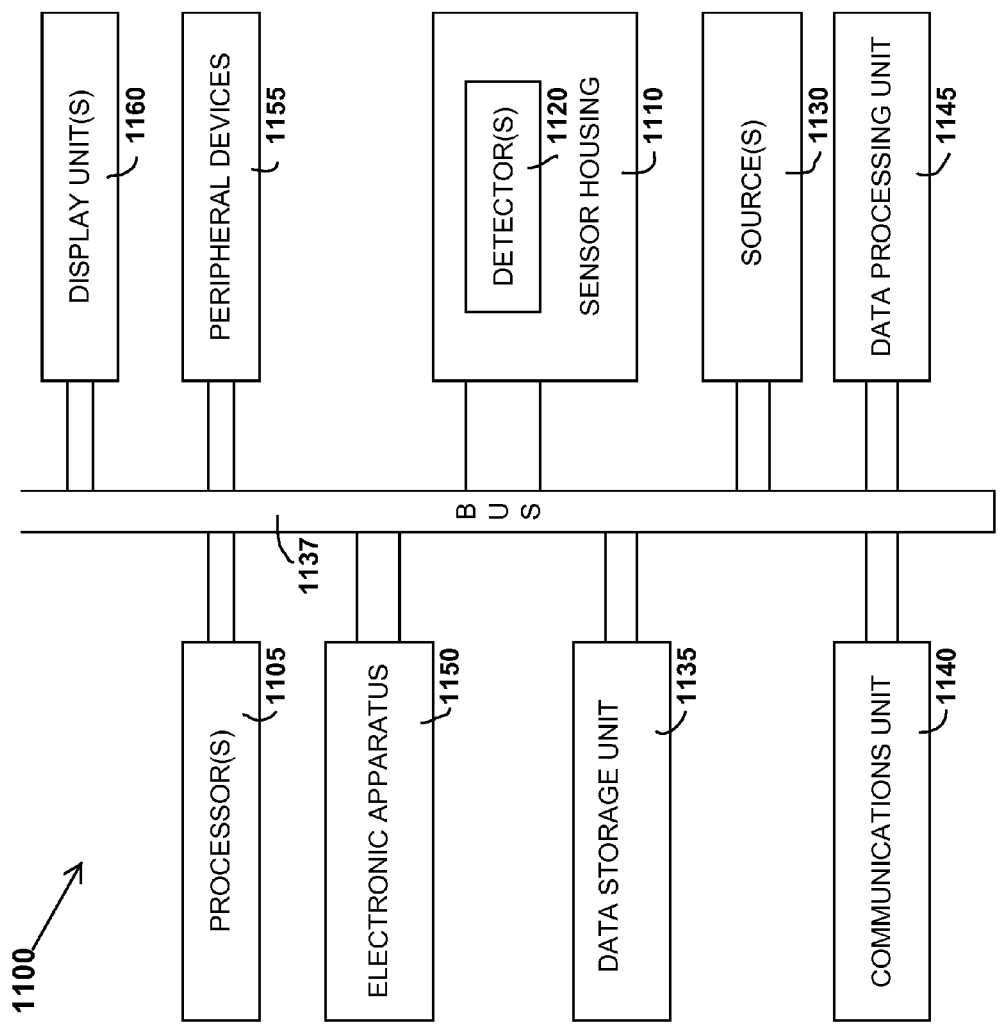
FIG. 11 depicts a block diagram of features of an example embodiment of a system having a sensor housing containing one or more detectors, where sensor housing is transferable from a drill-string element to another drill-string element without a calibration measurement during or after the transfer.

FIG. 11 depicts a block diagram of features of an example embodiment of a system 1100 having a sensor housing 1110 containing one or more detectors 1120, where sensor housing 1110 is transferable from a drill-string element to another drill-string element without a calibration measurement during or after the transfer. Sensor housing 1110 can be arranged for placement with a drill-string element, the sensor housing 1110 being a modular unit of hardware to make measurements in a well. System 1100 can include one or more processors 1105 operable to apply calibration coefficients from a data storage unit 1135 relative to a measurement reading from the detector(s) 1120 such that the sensor housing 1110 is transferable to another drill-string element without a calibration measurement during or after the transfer. Data storage unit 1135 can be realized as a memory device. System 1100 may include one or more sources 1130. Source(s) 1130 can be arranged in sensor housing 1110, in the same drill-string element as sensor housing 1110, or in a drill-string element different from the drill-string element in which sensor housing 1110 is located. System 1100 may be arranged without a source in applications in which detector(s) 1120 sense a natural emanation from a formation, such as gamma radiation. A natural emanation from a formation is an emanation generated without the formation being probed by a signal from a probing device.

System 1100 can also include an electronic apparatus 1150 and a communications unit 1140. Processor(s) 1105, data storage unit 1135, and communications unit 1140 can be arranged to operate as a processing unit to control management of sensor housing 1110 and to perform operations on data signals collected by detector(s) 1120. Data storage unit 1135 can include a database having calibration data to transfer sensor housing 1110 without conducting a calibration measurement. A data processing unit can be distributed among the components of system 1100 including electronic apparatus 1150. Alternatively, system 1100 can include a data processing unit 1145 to manage data associated with sensor housing 1110.

Communications unit 1140 can include downhole communications for communication to the surface at a well from sensor housing 1110. Such downhole communications can include a telemetry system. Communications unit 1140 may use combinations of wired communication technologies and wireless technologies at frequencies that do not interfere with on-going measurements.

System 1100 can also include a bus 1137, where bus 1137 provides electrical conductivity among the components of system 1100. Bus 1137 can include an address bus, a data bus, and a control bus, each independently configured. Bus 1137 can be realized using a number of different communication mediums that allows for the distribution of components of system 1100. Bus 1137 can include a network. Use of bus 1137 can be regulated by processor(s) 1105.

In various embodiments, peripheral devices 1155 can include additional storage memory and/or other control devices that may operate in conjunction with processor(s) 1105 and/or data storage unit 1135. In an embodiment, processor(s) 1105 can be realized as a processor or a group of processors that may operate independently depending on an assigned function. Display unit(s) 1160 can be arranged with a screen display, as a distributed component on the surface, that can be used with instructions stored in data storage unit 1135 to implement a user interface to manage the operation of sensor housing 1110 and/or components distributed within system 1100. Such a user interface can be operated in conjunction with communications unit 1140 and bus 1137. Display unit(s) 1160 can include a video screen, a printing device, or other structure to visually project information regarding data generated from the measurements of detector(s) 1120.

Figure 12:
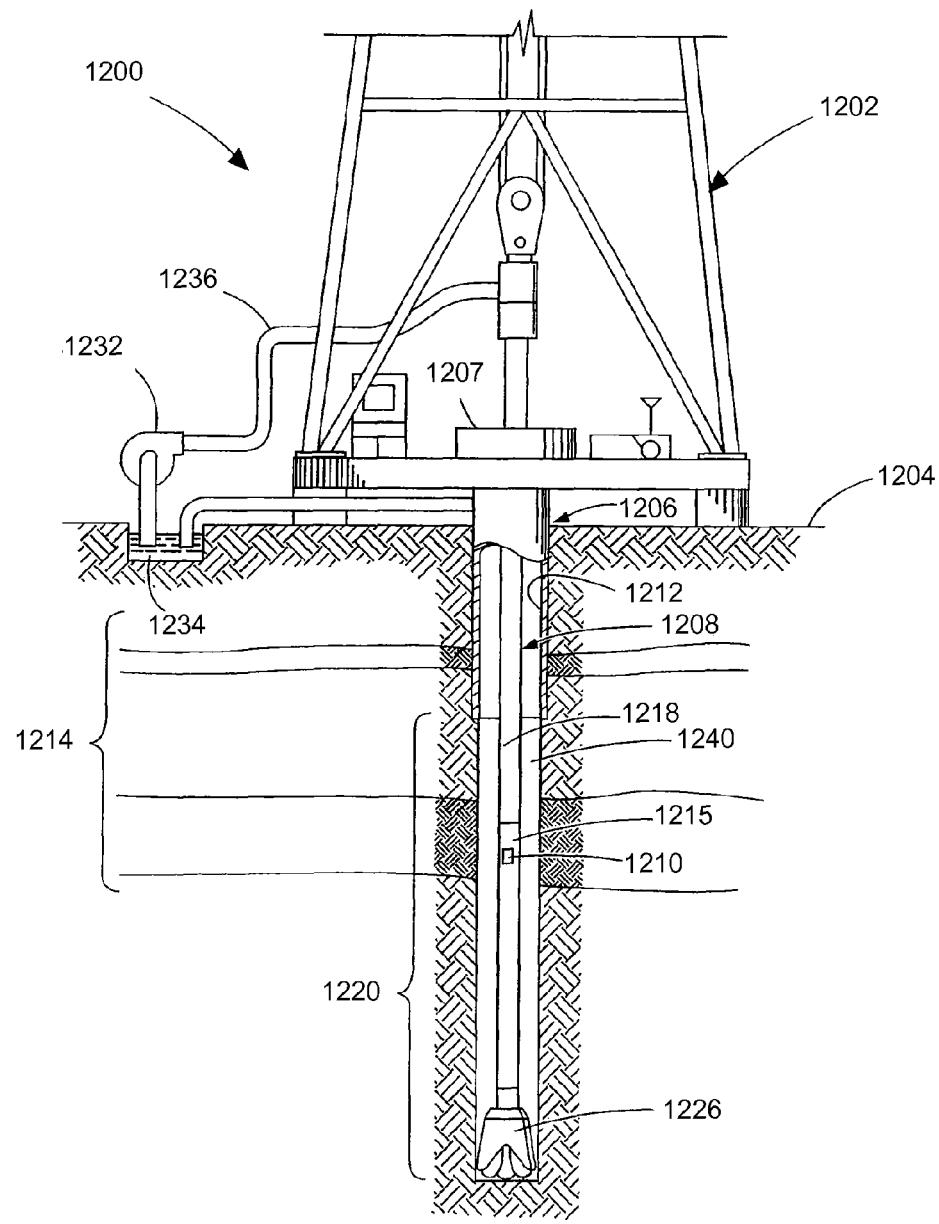
FIG. 12 depicts an embodiment of a system at a drilling site, where the system includes an interchangeable housing for drilling collars with the housing arranged in accordance with a housing embodiment.

FIG. 12 depicts an embodiment of a system 1200 at a drilling site, where system 1200 includes an interchangeable housing 1210 for drilling collars with the housing arranged similar to or identical to housing arrangements in accordance with teachings herein. System 1200 may include a drilling rig 1202 located at a surface 1204 of a well 1206 and a string of drill pipes, that is drill string 1208, connected together so as to form a drilling string that is lowered through a rotary table 1207 into a wellbore or borehole 1212. The drilling rig 1202 may provide support for drill string 1208. The drill string 1208 may operate to penetrate rotary table 1207 for drilling a borehole 1212 through subsurface formations 1214. The drill string 1208 may include drill pipe 1218 and a bottom hole assembly 1220 located at the lower portion of the drill pipe 1218.

The bottom hole assembly 1220 may include drill collars 1215, housing 1210, and a drill bit 1226. Housing 1210 is not limited to an upper portion of drill collar 1215, but may be situated at any location along drill collar 1215. The drill bit 1226 may operate to create a borehole 1212 by penetrating the surface 1204 and subsurface formations 1214. Housing 1210 may include sensors to make measurements while drilling. In various embodiments, housing 1210 may be interchanged among different drill collars without calibration following the transfer to a different drill collar.

During drilling operations, the drill string 1208 may be rotated by the rotary table 1207. In addition to, or alternatively, the bottom hole assembly 1220 may also be rotated by a motor (e.g., a mud motor) that is located downhole. The drill collars 1215 may be used to add weight to the drill bit 1226. The drill collars 1215 also may stiffen the bottom hole assembly 1220 to allow the bottom hole assembly 1220 to transfer the added weight to the drill bit 1226, and in turn, assist the drill bit 1226 in penetrating the surface 1204 and subsurface formations 1214.

During drilling operations, a mud pump 1232 may pump drilling fluid (sometimes known by those of skill in the art as "drilling mud") from a mud pit 1234 through a hose 1236 into the drill pipe 1218 and down to the drill bit 1226. The drilling fluid can flow out from the drill bit 1226 and be returned to the surface 1204 through an annular area 1240 between the drill pipe 1218 and the sides of the borehole 1212. The drilling fluid may then be returned to the mud pit 1234, where such fluid is filtered. In some embodiments, the drilling fluid can be used to cool the drill bit 1226, as well as to provide lubrication for the drill bit 1226 during drilling operations. Additionally, the drilling fluid may be used to remove subsurface formation 1214 cuttings created by operating the drill bit 1226.

In typical conventional drilling operations, calibrations are specific to one drill collar and have to be recalibrated if the sensors were moved to another collar. In various embodiments, modular housings may be arranged for adaptation to drilling collars to make measurements while drilling such that calibration is not made with the transfer of the housing from one drilling collar to another drilling collar. Various embodiments of housings may reduce the amount of equipment at a field location to do extended runs. Such modular housing may also reduce the amount of time spent by personnel in calibrating tools.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system comprising:
    a sensor housing containing a detector, the sensor housing arranged for placement with a drill-string element, the sensor housing being a modular unit of hardware to make measurements in a well; and
    a processor operable to apply calibration coefficients from a data storage unit relative to a measurement reading from the detector such that the sensor housing is transferable to another drill-string element without a calibration measurement during or after the transfer, the calibration coefficients including calibration data correlated to variations in spacing and/or orientation associated with the detector due to the transfer to another drill-string element.

2. The system of claim 1, wherein the processor is disposed in the sensor housing.

3. The system of claim 1, wherein the data storage unit is disposed in the sensor housing.

4. The system of claim 1, wherein the calibration coefficients include calibration data of the sensor housing with respect to placement in a recess of a drilling collar in a drill string and calibration data with a source disposed in a different drill collar in the drill string.

5. The system of claim 1, wherein the system includes a measurement source external to the sensor housing, the measurement source having a distance to the sensor housing, the calibration coefficients selectable based on the distance.

6. The system of claim 1, wherein the sensor housing includes a density measurement tool.

7. The system of claim 1, wherein the sensor housing includes a neutron porosity measurement tool.

8. The system of claim 1, wherein the sensor housing includes an ultrasonic standoff measurement tool.

9. The system of claim 1, wherein the calibration coefficients include calibration data of the detector in the sensor housing and calibration data of a source with respect to a mounting of the source.

10. The system of claim 9, wherein calibration data of the source includes data correlated to mounting positions of the source in drill collars such that source position relative to the detector or to the sensor housing can vary between different drill-string elements to which the sensor housing is transferred.

11. The system of claim 1, wherein the calibration coefficients include calibration data of the sensor housing with respect to a plurality of different drill-string elements.

12. The system of claim 11, wherein the plurality of different drill-string elements includes drill-string elements of different sizes.

13. The system of claim 1, wherein the calibration coefficients include calibration data of the sensor housing with respect to a plurality of placements of the sensor housing in a recess of a drilling collar.

14. The system of claim 13, wherein the calibration coefficients include calibration data of the sensor housing in the recess with the sensor housing completely below an outer surface of the drilling collar.

15. The system of claim 13, wherein the calibration coefficients include calibration data of the sensor housing in the recess with the sensor housing extending outside an outer surface of the drilling collar.

16. The system of claim 1, wherein the calibration coefficients include calibration data associated with the sensor detecting natural emanations from a formation.

17. The system of claim 16, wherein the natural emanations include gamma radiation.

18. A method comprising:
transferring a sensor housing from a drill-string element to another drill-string element, the sensor housing containing a detector, the sensor housing being a modular unit of hardware to make measurements in a well; and
maintaining calibration coefficients in a data storage unit such that the transfer of the sensor housing is conducted without a calibration measurement during or after the transfer, the calibration coefficients operable to be applied by a processor relative to a measurement reading from the detector, the calibration coefficients including calibration data correlated to variations in spacing and/or orientation associated with the detector due to the transfer to another drill-string element.

19. The method of claim 18, wherein the calibration coefficients include calibration data of the detector in the sensor housing and calibration data of a source with respect to a mounting of the source.

20. The method of claim 19, wherein calibration data of the source includes data correlated to mounting positions of the source in drill collars such that source position relative to the detector or to the sensor housing can vary between different drill-string elements to which the sensor housing is transferred.

21. A machine-readable storage device having instructions stored thereon, which, when executed by one or more processors of a machine, cause the machine to perform operations, the operations comprising operations to:
engage, with respect to calibration data, in a transfer process of a sensor housing from a drill-string element to another drill-string element, the sensor housing containing a detector, the sensor housing being a modular unit of hardware to make measurements in a well; and
maintain calibration coefficients in a data storage unit such that the transfer of the sensor housing is conducted without a calibration measurement during or after the transfer, the calibration coefficients operable to be applied by a processor relative to a measurement reading from the detector, the calibration coefficients including calibration data correlated to variations in spacing and/or orientation associated with the detector due to the transfer to another drill-string element.

22. A machine-readable storage device of claim 21, wherein the calibration coefficients include calibration data of the detector in the sensor housing and calibration data of a source with respect to a mounting of the source.

23. A machine-readable storage device of claim 22, wherein calibration data of the source includes data correlated to mounting positions of the source in drill collars such that source position relative to the detector or to the sensor housing can vary between different drill-string elements to which the sensor housing is transferred.

* * * * *